United States Patent
Kim et al.

(10) Patent No.: US 8,164,016 B2
(45) Date of Patent: Apr. 24, 2012

(54) SWITCHING APPARATUS

(75) Inventors: Tae-Sun Kim, Aachen (DE); Rainer Felderhoff, Velbert (DE)

(73) Assignee: Huf Hulsbeck & Furst GmbH & Co. KG (DE)

( * ) Notice: Subject to any disclaimer, the term of this patent is extended or adjusted under 35 U.S.C. 154(b) by 200 days.

(21) Appl. No.: 12/663,892

(22) PCT Filed: Jul. 15, 2008

(86) PCT No.: PCT/EP2008/059211
§ 371 (c)(1),
(2), (4) Date: Dec. 10, 2009

(87) PCT Pub. No.: WO2009/013176
PCT Pub. Date: Jan. 29, 2009

(65) Prior Publication Data
US 2010/0175971 A1    Jul. 15, 2010

(30) Foreign Application Priority Data

Jul. 25, 2007   (DE) .................. 10 2007 035 241

(51) Int. Cl.
*H01H 9/00* (2006.01)
(52) U.S. Cl. .................................................. 200/313
(58) Field of Classification Search ............ 200/313, 200/314, 312, 303, 317
See application file for complete search history.

(56) References Cited

U.S. PATENT DOCUMENTS

| | | | |
|---|---|---|---|
| 3,467,802 A * | 9/1969 | Martin | 200/314 |
| 3,988,557 A * | 10/1976 | Francke et al. | 200/314 |
| 4,683,359 A * | 7/1987 | Wojtanek | 200/314 |
| 4,749,832 A | 6/1988 | Schlosser | |
| 2006/0201796 A1* | 9/2006 | Ostendorf et al. | 200/314 |

FOREIGN PATENT DOCUMENTS

| | | |
|---|---|---|
| DE | 2213299 | 10/1972 |
| DE | 3019021 | 11/1981 |
| DE | 29715873 | 12/1997 |
| DE | 19647218 | 4/1998 |
| DE | 202005003663 | 8/2005 |
| DE | 102004056886 | 6/2006 |
| DE | 102007001703 | 8/2007 |
| EP | 0869522 | 10/1998 |
| EP | 1468884 | 10/2004 |
| EP | 1701367 | 9/2006 |

OTHER PUBLICATIONS

International Search Report; PCT/EP2008/059211; Dec. 1, 2008.

* cited by examiner

*Primary Examiner* — Edwin A. Leon
(74) *Attorney, Agent, or Firm* — Cantor Colburn LLP

(57) ABSTRACT

The invention relates to a switching apparatus (10) for switching a load on and off, in particular a motor or the like in a vehicle, having a housing (20), an operating element (30), a switching element (40), wherein the switching element (40) can be activated by the operating element (30), and at least one switching signal for a control unit can be produced by means of the switching element (40), and the operating element (30) has a symbol element (50). The invention provides for a first optical waveguide element (60) to carry a first light (71) from at least one first light source (70) such that the symbol element (50) is uniformly illuminated.

17 Claims, 4 Drawing Sheets

SWITCHING APPARATUS

TECHNICAL FIELD

The invention relates to a switch device for switching a load on and off, especially an engine, etc., in a vehicle, with a housing, an activation element, a switch element, the switch element being activatable by the activation element, by means of which switch element at least one switch signal for a control unit can be generated, the activation element having a symbol element.

BACKGROUND

An ignition switch is described in EP 1,468,884 A1, which is used to start or turn off a vehicle engine. The ignition switch is arranged in the vicinity of a steering column and has a body arranged to be movable in a housing. A switch element is also integrated in the ignition switch, which serves to detect a displacement of the moving element. A symbol element is also situated on the moving element. This symbol element serves to display the status of the vehicle engine. In this type of ignition switch, a driver touches the moving element and moves it with his finger, so that the switch element starts or shuts off the engine. It has proven a drawback in such ignition switches that the symbol element often cannot be clearly recognized, so that a user remains unclear about the status of the vehicle.

BRIEF SUMMARY

The disclosure provides a switch mechanism for switching on and switching off of a load, in which the drawbacks mentioned are avoided, especially providing an inexpensive and compact switch device for switching a load on and off that ensures easy and user-friendly operation.

It is proposed according to the invention that a first light-guide element guides a first light of at least one first light source, so that the symbol element is illuminated uniformly.

The homogeneously illuminated symbol element permits a user to recognize the status of the switch device clearly, so that operating errors are avoided. To achieve uniform illumination of the symbol element, it is proposed according to the invention that the first light-guide element guides the first light. The task of the first light-guide element is to control the first light, which is often collimated, and, if necessary, split it, thus permitting uniform illumination of the symbol element.

In a first advantageous embodiment, it is proposed that the first light-guide element reflects the first light. The first light-guide element is a mechanical object that reflects the first light on its surface in the direction of the symbol element. This reflection can preferably occur diffusely, in order to achieve homogeneous distribution of light flux. Diffuse reflection can be achieved, in particular, by a roughened surface of the first light-guide element. If the first light impinges on the roughed surface, the first light-guide element reflects the first light with a stochastic angular distribution.

In order to achieve increased user-friendliness, the symbol element can be arranged on the activation element and inform a potential user concerning the status of the vehicle. In this case, it has proven advantageous if the first light-guide element is arranged within the housing and behind the activation element. Rear illumination of the symbol element is thereby possible by means of the first light. The first light-guide element is advantageously molded onto the activation element. This variant is to be preferred, in particular, if both the activation element and the light-guide element are made of plastic. The activation element and the first light-guide element can be produced as a unit component. This one-piece combination is preferably produced by injection molding, injection blowing, or extrusion.

Another advantageous variant of the switch device is characterized in that the first light-guide element at least partially encloses the first light source in the manner of a cap and/or screen. A system of a first light-guide element and a first light source, similar to a headlight, can be produced with the first light-guide element configured this way. Under the assumption that the symbol element is integrated into the activation element, the first light source can radiate into the housing. A first light-guide element, configured as a paraboloid of revolution, can trap the collimated first light and divert it in the direction of the activation element or the symbol element. In another advantageous embodiment, the first light-guide element has a number of reflector surfaces. Such a first light-guide element is obtained, for example, from a combination of three triangular reflector surfaces that form a triple mirror in combination. This triple mirror permits targeted reflection of the first light, which can be easily calculated in advance. An opening side of the first light-guide element then faces the activation element. The area of the light-guide element, from which the first light emerges, is referred to as the opening side. If the first light enters a section of the light-guide element and emerges from another section, by definition, the latter section is the opening side. The first light-guide element is a paraboloid, cap-like, and/or screen-like reflector, and the opening side generally faces the activation element.

In order to achieve high efficiency, in another advantageous embodiment, the reflector surface is at least partially provided with a reflector layer, the reflector layer reflecting especially the first light diffusely. A higher percentage of first light is reflected in the direction of the symbol element, because of the reflector layer. At the same time, the reflector layer reduces the part of the first light that is absorbed in the first light-guide element, which prevents heating of the first light-guide element. Depending on the application, it has proven advantageous to use a white paint or paint mixed with metal particles as reflector layer. Such types of paints are used, in particular, when the first light-guide element is produced from plastic or from a metal such as aluminum. If, on the other hand, the first light-guide element is made from stainless steel, the reflector layer can also be produced by the surface of the first light-guide element being polished to a high gloss. In addition, the reflector layer can have a luminescent and/or fluorescent material.

Depending on the first light source used, the first light can leave it almost parallel. However, such a collimated light beam is often not sufficient to ensure uniform illumination of the symbol element. Consequently, in another advantageous embodiment, it is proposed that the first light-guide element have a scattering device, which ensures widening of the collimated light beam.

However, widening of the light beam must not lead to a reduction of homogeneous distribution of the light flux on the illuminated symbol element. Consequently, it has proved advantageous to use one of the following scattering devices: a diffusing disk, a diffusing dome, or a diverging lens. The scattering devices listed ensure that a collimated light beam is uniformly widened, and homogeneous illumination of even a large-area symbol element is guaranteed. Advantageously, the diverging lens is a glass or Plexiglas element specially adapted to the wavelength of the first light, in order to achieve low absorption. The scattering device can be connected as a material unit to the light-guide element, and also have a reflector layer. The scattering device is often arranged, so that no first light can impinge directly on the symbol element from the first light source. Instead, the scattering device reflects the first light to the first light-guide element, where it is then reflected in the direction of the symbol element. This procedure reduces the probability of illumination fluctuations. Such illumination fluctuations are visible to a potential user, since certain areas of the symbol element light up more brightly than others. Overall, it has turned out that illumination fluctuations are rather unpleasant for a user and should therefore be avoided.

In an advantageous embodiment of the switch device, it can have a circuit board. The circuit board serves for mechanical attachment and electrical connection of electronic components. Such a circuit board can be produced from an insulating base plate, onto which connection lines made of a thin layer of conducting material are applied. Since the switch element of the switch device can be formed as an electronic component, it has proved advantageous to arrange this on the circuit board and supply it with power by means of the circuit board. The circuit board can therefore also be used to provide the electrical power supply to the first light source. Since the circuit board has a base plate, firm and permanent attachment of the first light-guide element can be produced simply and cheaply. The circuit board can also be equipped with all elements before being integrated into the housing. Consequently, the first light source and the first light-guide element can be precisely aligned on the circuit board without requiring complex integration beneath the housing.

For connecting the first light-guide element to the switch device, in an advantageous embodiment, the first light-guide element can have a snap device, whereby the snap device cooperates with a mating snap device of the switch device. The snap device can be a clip element that cooperates in a press-fitted and/or shape-mated manner with a receptacle element and ensures reversibly separable connection. Depending on the configuration of the switch device and the arrangement of the symbol element, the mating snap device can be arranged on at least one of the following parts: the circuit board, the housing, the activation element, or the first light source. In addition to a reversibly separable connection of the light-guide element to the switch device, the first light-guide element can also be glued into the switch device, soldered on, or sputtered on. Such bonded connections are simple and cheap to produce and are generally not influenced by environmental conditions. For connecting the first light-guide element to the switch device, common glues can be used. It is likewise possible that the first light-guide element is designed to be laser-transparent and the switch device to be laser-absorbing, so that connection of the two elements by laser welding is possible.

Another advantageous variant of the switch device is characterized in that it has a second light source. The second light source can illuminate the symbol element if the first light source fails. For this purpose, the first light-guide element can guide the first light of the first light source and a second light of the second light source, so that the symbol element is uniformly illuminated. To ensure this, the first light-guide element must have correspondingly shaped reflector areas, both for the first and the second light sources. For this purpose, the first light-guide element can have several reflector surfaces arranged stepwise, one reflector step being assigned to each light source. In another embodiment, the first light and the second light of the two light sources can have different wavelengths, in order to illuminate the symbol element in different colors. The first and second light sources are preferably connected to a computer unit that controls a switch state of the light sources. It is thus possible to activate either the first or second or both light sources through the computer unit. This has the advantage that a user can be shown a number of switch states by color changes of the symbol element.

Another advantageous embodiment of the switch device is characterized in that a second light-guide element guides the second light of the second light source. In this variant, each of the two light sources is assigned an individual light-guide element. In contrast to a first light-guide element that guides the light of two light sources, in this variant, the mechanical size of the light-guide element can be reduced. Moreover, the first and second light-guide elements are each provided with an individual reflector layer, which is adapted to the wavelength of the first and second new light. Uniform illumination of the symbol element is thereby ensured.

Depending on the arrangement of the first or second light sources, light emission of the first and/or second lights can occur essentially at right angles or parallel to an activation surface of the activation element. In the switch device according to the invention, the activation element can be manipulated by a user in order to switch on or switch off a load. The user then touches the activation surface of the activation element, which has at least the size of a finger. The activation surface often has a flat or dome-like geometry for haptic reasons. The symbol element is arranged within the activation element, and the first light source is preferably arranged behind the symbol element. The spatial configuration of the switch device generally determines the arrangement in the first and/or second light source. For example, the first and/or second light source can be arranged on the circuit board, which leads away from the activation element like a blade. In this case, the light emission of the first and/or second light sources can occur parallel to the activation surface of the movement element, i.e., at right angles to the surface of the circuit board. The first light-guide element must then deflect the first and/or second light by 90°, so that the symbol element is illuminated. It is likewise conceivable that the first light-guide element is arranged so that light emission occurs away from the activation surface of the activation element. In this case, paraboloid light-guide elements have proven advantageous, which reflect the first and/or second light in the direction of the symbol element.

In another advantageous variant, the symbol element has at least a first area and a second area. The two areas can serve to display different information to a user. The first light of the first light source can illuminate the first area and a second light of the second light source can illuminate the second area uniformly. The two areas and therefore different information can be homogeneously illuminated, in order to clearly display the user a state of the switch device.

In another advantageous embodiment, the first and/or second light source is at least one of the following: an LED, an OLED, or a fluorescent lamp. Depending on the application, one or more of the illumination elements mentioned can be combined in one light source. A light-emitting diode (LED) is a semiconductor component that emits incoherent light with a narrow spectrum. The wavelength of the emitted light depends on the semiconductor components and possible doping. An organic light-emitting diode (OLED), also usable, is a special type of LED, in which the light-emitting layer is formed from organic components.

In another advantageous variant, the first light-guide element has at least one mechanical guide element. The guide element serves to position the first light-guide element with respect to the first light source. For this purpose, the mechanical guide element can be arranged like a rail and cooperate with a side flank of the first light source, in order to ensure distinct positioning of the first light-guide element. The guide element is advantageously configured in such a way that the first light-guide element can only be mounted in alignment with the first light source.

Depending on the application, it has proved advantageous if the symbol element is arranged on, against, and/or in the activation element. The symbol element, for example, can be a row of letters that inform the user about the status of a vehicle. For this purpose, the symbol element can be milled into the activation element. It is also conceivable that the symbol element is formed from a number of light-guiding elements that are inserted into the activation element. The symbol element is advantageously formed like a film and covers at least parts of the back of the activation element, facing away from the user. Light that does not directly impinge on the individual elements of the symbol element arranged in the activation element can thus be guided toward it. Moreover, the activation element and the symbol element can be made in one piece.

In an advantageous variant, the first and/or second light source is connected to at least one computer unit through a bus system, whereby the bus system serves for mono-and/or bidirectional exchange of at least one control state of the first and/or second light source. In order to report the control state, it has proved advantageous, if the bus system has a serial or parallel architecture. Parallel architecture then denotes a digital transmission in which several bits are transmitted simultaneously (i.e., in parallel). In contrast to this, during serial data transmission, information is transmitted bit by bit in succession through the data-transmission medium. The bus system advantageously has one of the following parallel architectures: ATA (Advanced Technology Attachment), GPIB (General Purpose Interface Bus), or HIPPI (High Performance Parallel Interface). If a serial system architecture is to be used, it has proved advantageous to use one of the following architectures: ACCESS.bus, ASI-Bus, ByteFlight, Controller Area Network (CAN), European Installation Bus (EIB), ISYGLT (Innovative SYstem for Building Guide Technology), KNX, Local Control Network (LCN), FlexRay, Universal Serial Bus (USB), FireWire, eSATA (External Serial ATA), Profibus, MOST-Bus, Time-Triggered Protocol (TTP), LIN-Bus, ControlNet, INTERBUS, ML-Bus, Safety-BUS p, or Spacewire.

The switch device according to the invention, based on the space-saving embodiment, can also be arranged in or on the steering wheel itself, especially in the area of an emblem or in the area of impact or gripping surfaces. Only one or a few electrical conductors go from this switch device, so that simple cabling in the steering wheel is possible. It is even conceivable to arrange the switch device on a gearshift, on a center console, on a multifunction operating unit on the dashboard, on an internal door panel, on the sunroof, on an internal rearview mirror, or to the left and right of the steering wheel in the vehicle. Operating comfort during starting of an engine, etc., can therefore be significantly increased, since the ergonomic interests of the driver can be considered.

The present invention can also be used for a safety system for keyless activation or deactivation of a system or device, especially a steering-wheel lock (which is considered an important functional component in a vehicle) or an engine in a vehicle. This safety system is equipped with a switch device and a mobile ID transmitter, whereby data can be transmitted between the switch device and the ID transmitter. In addition, a control unit is provided in the safety system that controls at least data transmission between the switch device and the mobile ID transmitter. In this safety system, the driver or operator of the vehicle need not be actively identified, in order to cause free switching or activation of the system. Only by activation of the switch device, especially the activation element, is the identification process automatically started, in which case, data transmission is used to transmit the coded waking or activation signal from the switch device to the ID transmitter. After the mobile ID transmitter has received and checked this waking signal, it sends an identification code back to the safety system. This can also occur, on the one hand, by data transmission or by means of an additional receiver unit that receives by radio the identification data from the mobile ID transmitter and conveys it to the control unit. The control unit then compares the identification data with stipulated identification data and performs a corresponding check of the individual loads or devices with a positive identification, depending on which switch position or which switch signal of the switch device is present. For example, the electrical steering-wheel lock can be unlocked and the engine-management system released, in order to start the engine in a vehicle.

BRIEF DESCRIPTION OF THE DRAWINGS

Additional steps and advantages of the invention can be seen from the claims, the following description, and the drawings. The invention is shown in the drawings in several embodiment examples. In the drawings:

DETAILED DESCRIPTION

Figure 1:
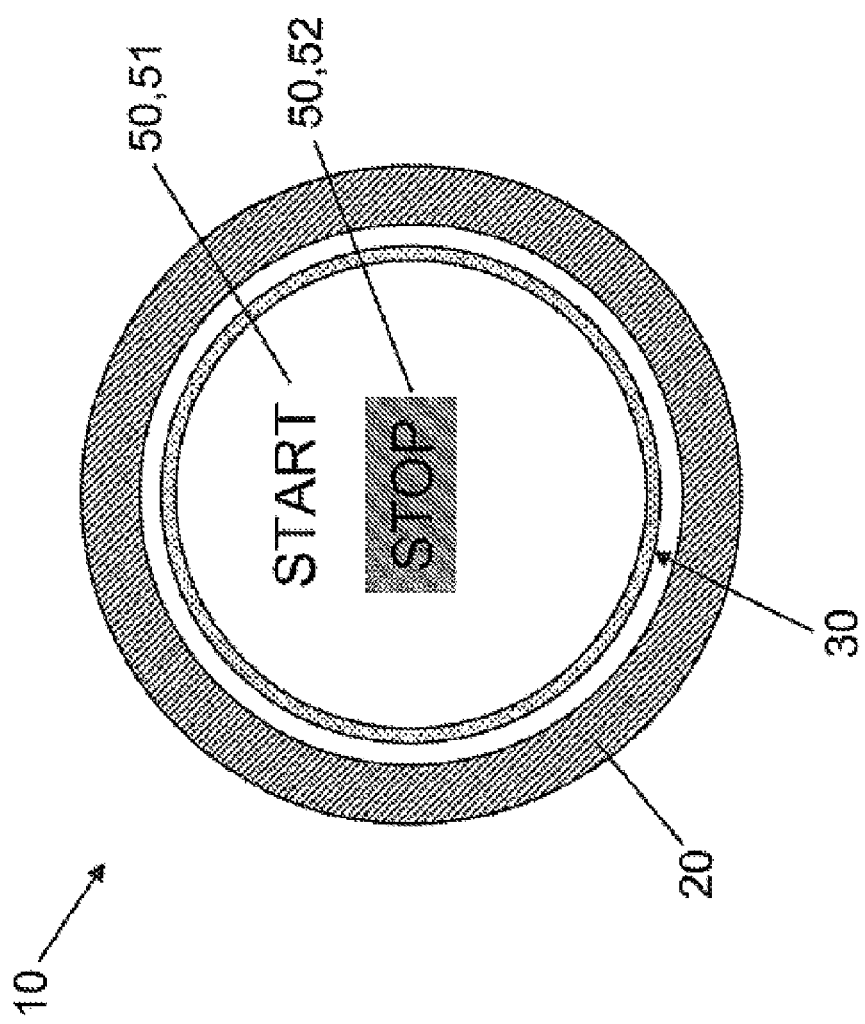
FIG. 1 shows a front view of a switch device.

A front view of a switch device 10 for switching on or switching off a load, especially an engine in a vehicle, is shown in FIG. 1. A housing 20 of the switch device 10 encloses an activation element 30 like a collar. By means of the activation element 30, a switch element 40 (not shown) can be activated. Activation can occur by the activation element 30 being pushed in the direction of the plane of the drawing into the housing 20. In the embodiment example shown, the switch device 10 is a start/stop switch for a vehicle. A symbol element 50, which forms the words "Start" and "Stop" is arranged on the activation element 30.

In known switch devices, it has proven to be a drawback that the symbol elements often cannot be clearly recognized by a user. Because of this, there is a possibility that the user will obtain an incorrect interpretation of the status of the vehicle. To overcome this drawback, it is proposed according to the invention that a first light-guide element guides a first light from at least a first light source, so that the symbol element 50 is uniformly illuminated.

Figure 2:
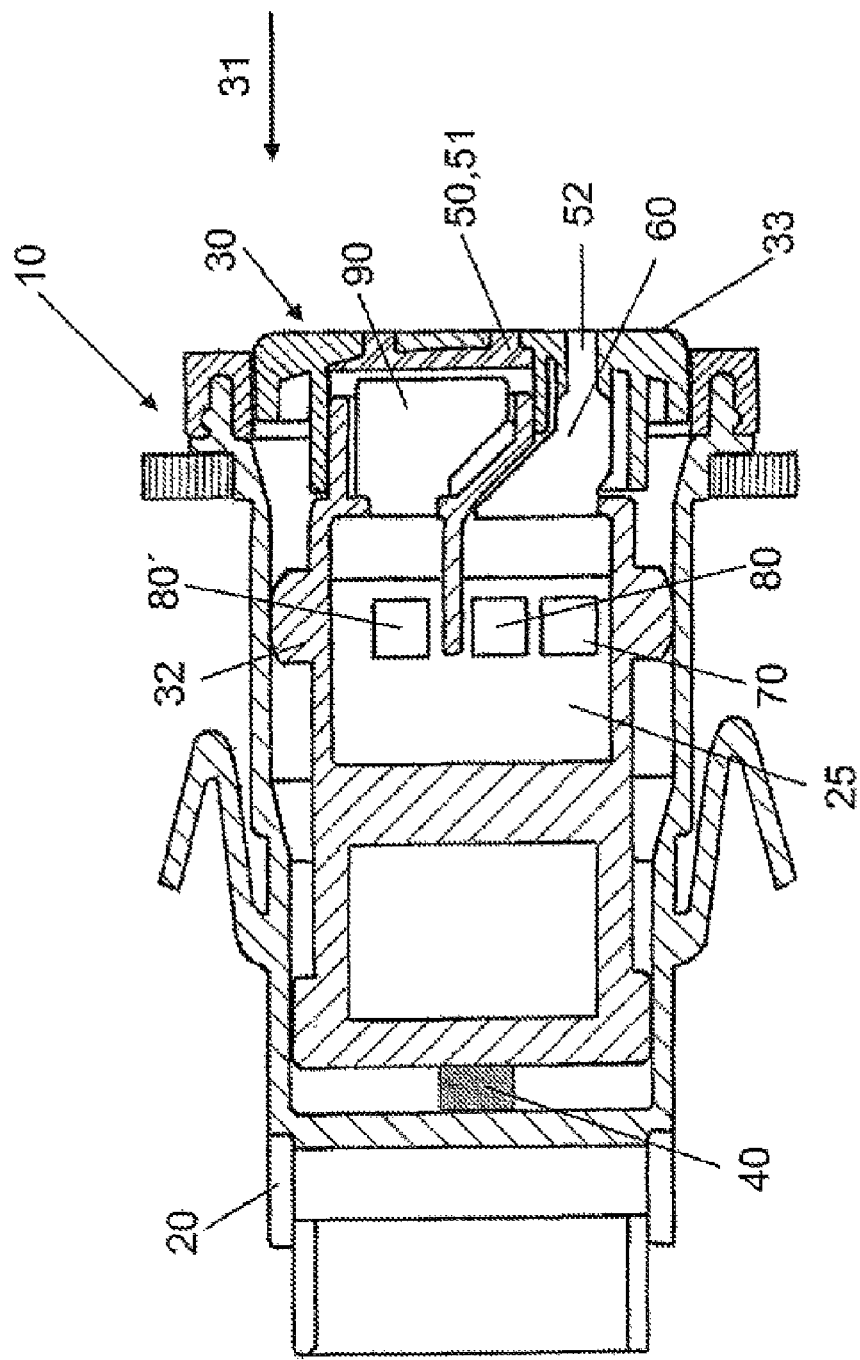
FIG. 2 shows a schematic section drawing of a switch device.

The design of a switch device 10 configured in this way is shown by the section drawing in FIG. 2. The housing 20 in which the activation element 30 is arranged can be seen. In the rear area of the housing 20, a switch element 40 is arranged between a cross-connector and a frame 32 of the activation element 30. By pushing the activation element 30 in the direction of movement arrow 31, a switch signal for a control unit (not shown) can be generated. The frame 32 is connected to an activation surface 33 of the activation element 30 in the housing interior. A circuit board 25 is arranged within frame 32. This circuit board 25 serves as a base for the electronics inherent in the switch device 10. The first light source 70, as well as two additional second light sources 80, 80', are also arranged on the circuit board 25. The light emitted by light sources, 70, 80, 80' flows into the plane of the drawing. In order to illuminate symbol element 50 uniformly, a switch device 10 according to the invention has a first light-guide element 60 and a second light-guide element 90.

Figure 3:
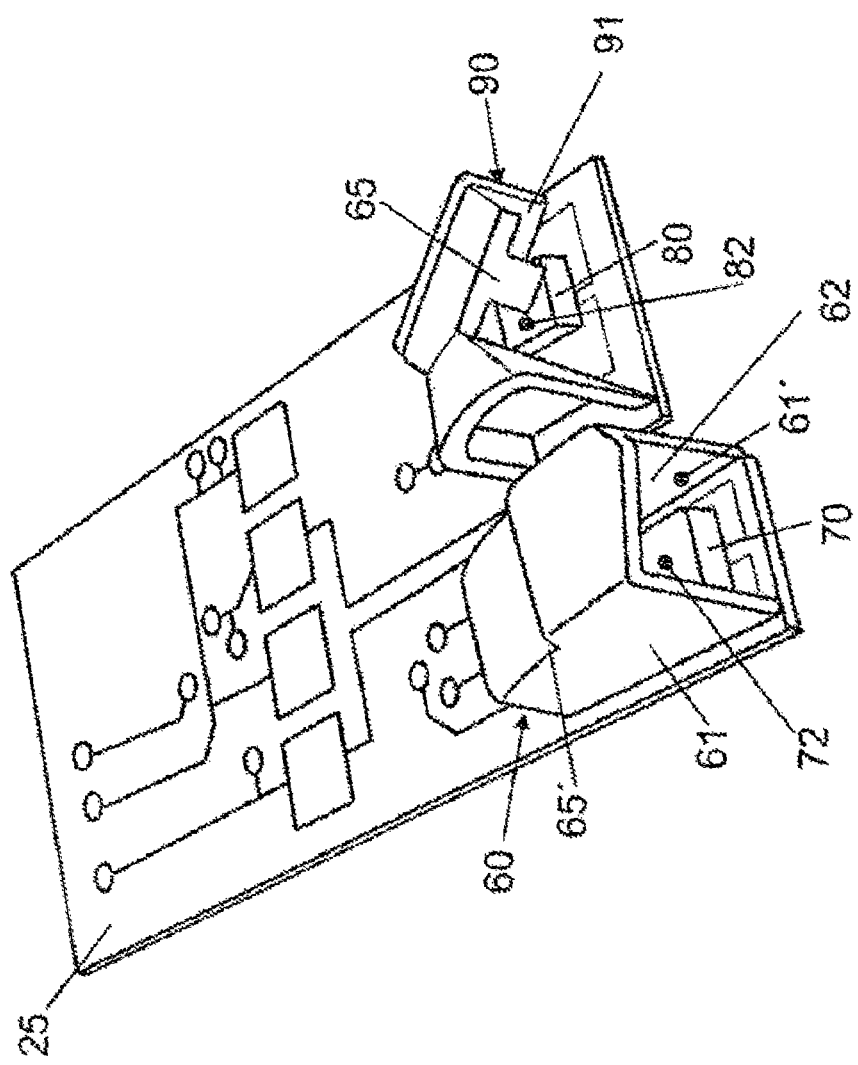
FIG. 3 shows a circuit board of a switch device.

FIG. 3 will be used to explain the method of operation of the switch device 10 according to the invention. The circuit board 25, the first light source 70, and the first light-guide element 60 are shown in this drawing. The first light source 70 is a cuboid LED, arranged on a circuit board 25. This first light source 70 is covered by the hood-like first light-guide element 60. This first light-guide element 60 is connected to the circuit board 25 by means of at least one snap device. The snap device (not shown) can be a clip, for example, which cooperates in a press-fitted and/or shape-mated manner with a correspondingly shaped mating snap device of the circuit board 25. The first light-guide element 60 has a number of reflector surfaces 61, 61', on which the first light 71 emitted from the first light source 70 is diffusely reflected. For this purpose, the reflector surfaces 61, 61' can be coated at least in areas with a reflector layer. The reflector layer can be a white paint having a high degree of reflection, and a large percentage of the first light 71 emitted from the first light source 70 is therefore passed through an opening 62 of the first light-guide element 60. The symbol element 50 is arranged according to the invention in front of the opening 62. Because of the shaping of the first light-guide element 60 and the coating of the reflector surfaces 61, 61' with the reflector layer, a homogeneous light flux is formed, which passes uniformly through the opening 62 and illuminates the symbol element 50. This permits a user of the switch device 10 according to the invention always to be clearly informed concerning the status of the switch device 10.

To display a variety of information, the symbol element 50 can have at least a first area 51 and a second area 52. For uniform illumination of the second area 52, a second light source 80 is mounted on circuit board 25 in FIG. 3. This second light source 80 is enclosed by a second light-guide element 90, designed like a screen. This second light-guide element 90 ensures that a second light 81 emitted by the second light source 80 homogeneously and uniformly illuminates the second area 52 of the symbol element 50. In the embodiment example shown, the second light 81 emerges from a light outlet 82 of the second light source 80 and is reflected onto the reflector surfaces 91 of the second light-guide element 90. In order for no brightness distribution to occur during illumination of the symbol elements 50, the second light-guide element 90 has a scattering device 65. If the second light 81 impinges directly on the scattering element 65 from the second light source 80, it reflects the second light 81 on the reflector surfaces 91 of the second light-guide element 90. Because of this, direct illumination of the symbol element 50 by the second light source 80 is prevented. Instead, it is ensured that the second light 81 of the second light source 80 is always reflected first by the second light-guide element 90, in order to achieve uniform illumination.

The first light-guide element 60 also has a scattering device 65'. In contrast to this scattering device 65 of the second light guide element 90, the scattering device 65' is an indentation within the cap-like reflector surface 61. The first light 71 of the first light 70 emerging from the light outlet surface 72 is diffusely reflected on the scattering device 65', in order to also achieve uniform illumination of the symbol element 50.

Figure 4:
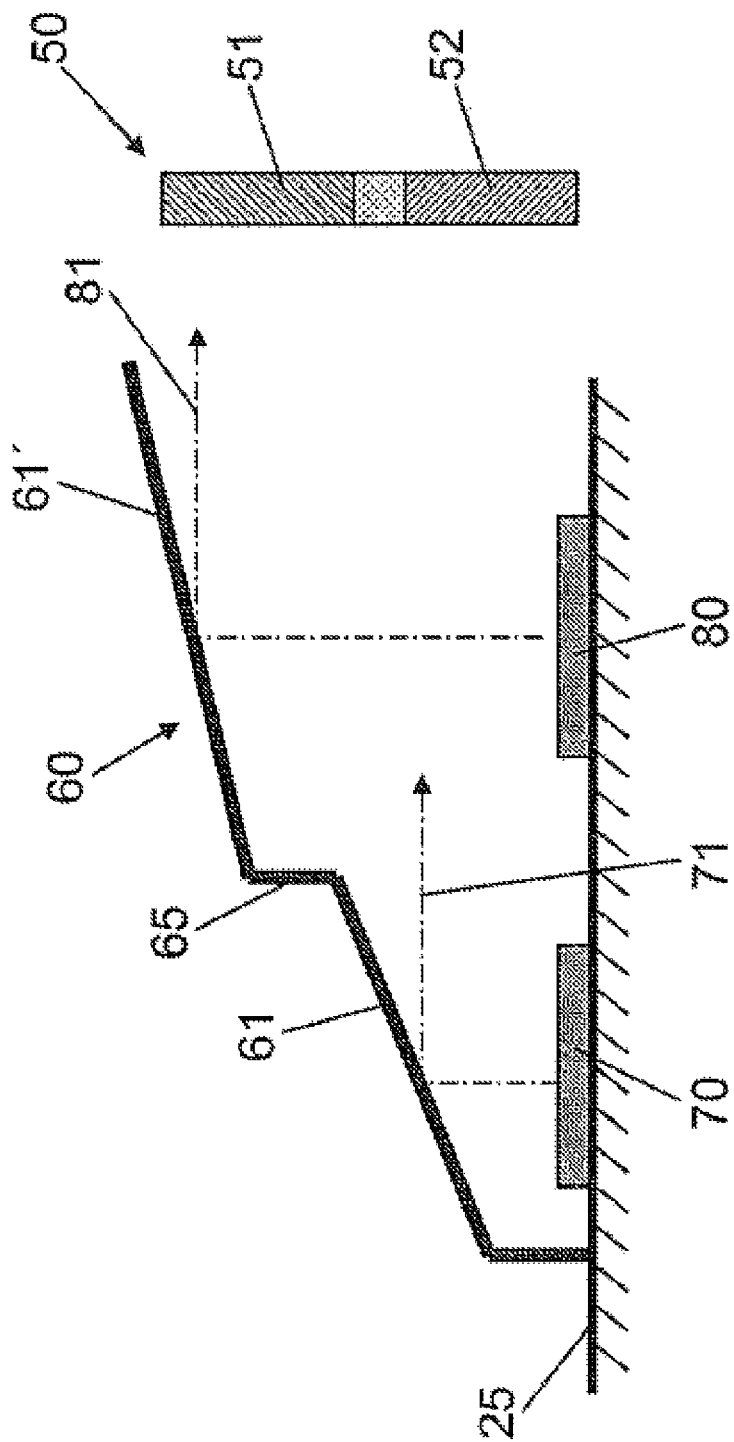
FIG. 4 shows a section drawing of a first light-guide element.

Another possible embodiment of the first light-guide element 60 according to the invention is shown in FIG. 4. The starting point for this embodiment of the light-guide element 60 is that the symbol element 50 has two areas 51, 52. These two areas 51, 52 can display different information for a user.

In order to illuminate the first 51 and second area 52 uniformly, the first light source 70 and the second light source 80 are arranged one behind the other on the circuit board 25. The first light source 71 of the first light source 70 is deflected on the reflector surface 61 of the first light-guide element 60 in the direction of the second area 52. By corresponding coating of the reflector surface 61, a diffuse light flux of the first light 71 is produced, which guarantees that the second area 52 is fully illuminated uniformly. The second light source 80 is arranged spatially in front of the first light source 70. The second light 81 emitted from this second light source 80 is reflected on the reflector surface 61', in order to uniformly illuminate the first area 51 of the symbol element 50. According to the invention, a scattering device 65 is arranged between the reflector surface 61 and the reflector surface 61'. This scattering device 65 in the variant shown ensures that no mixing of the first light 71 and the second light 72 occurs. This prevents undesired illumination of one of the two areas 51, 52 by a light source 70, 80 not assigned to it. This embodiment of the light-guide element 60 has proved particularly advantageous if the first light 70 and the second light 81 have different wavelengths. The color differentiation configured in this way between the first area 51 and the second area 52 facilitates informing a potential user about the status of the switch device 10.

The invention claimed is:

1. A switch device for switching a load on or off in a vehicle, comprising:
   a housing,
   an activation element, and
   a switch element,
   wherein the switch element is activatable by the activation element, at least one switch signal for a control unit is generatable by means of the switch element, the activation element having a symbol element,
   wherein a first light-guide element guides a first light of at least a first light source, so that the symbol element is illuminated uniformly,
   wherein the first light-guide element encloses the first light source at least partially in a cap-like and/or screen-like manner, wherein the first light-guide element has a number of reflector surfaces, and wherein an opening side of the cap-like and/or screen-like first light-guide element faces the activation element.

2. A switch device according to claim 1, wherein the first light-guide element reflects the first light.

3. A switch device according to claim 1, wherein the first light-guide element is arranged within the housing and behind the activation element, and wherein the first light guide element is molded onto the activation element.

4. A switch device according to claim 1, wherein the reflector surfaces are provided at least in areas with a reflector layer, in whereby the reflector layer diffusely reflects the first light, wherein the reflector layer has a luminescent material.

5. A switch device according to claim 1, wherein the first light source is arranged at least partially in the first light-guide element.

6. A switch device according to claim 1, wherein the first light-guide element has a scattering device, whereby the scattering device comprises at least one of the following: a diffusing disk, a diffusing dome, or a diverging lens.

7. A switch device according to claim 1, wherein the switch device has a circuit board and the first light-guide element and the first light source are arranged on the circuit board.

8. A switch device according to claim 1, wherein the first light-guide element has a snap device, the snap device cooperating with a mating snap device of the switch device, and wherein the mating snap device is arranged on at least one of the following: a circuit board, a housing, an activation element, or a first light source.

9. A switch device according to claim 1, wherein the switch device has a second light source if the first light guide element guides the first light of the first light source, and a second light of the second light source.

10. A switch device according to claim 9, wherein the first light and the second light have different wavelengths.

11. A switch device according to claim 9, wherein a second light guide element guides the second light of the second light source.

12. A switch device according to claim 9, wherein a light emission of the first and/or second light is essentially orthogonal or parallel to an activation surface of the activation element.

13. A switch device according to claim 9, wherein the symbol element has at least a first area and a second area.

14. A switch device according to claim 13, wherein the first light of the first light source illuminates the first area and a second light of the second light source illuminates the second area uniformly.

15. A switch device according to claim 14, wherein the first and/or second light source is at least one of the following: an LED, an OLED, or a fluorescent lamp.

16. A switch device according claim 1, wherein the light-guide element has at least one mechanical guide element, the guide element being used to position the first light-guide element with respect to the first light source.

17. A switch device according to claim 1, wherein the symbol element is designed like a film, wherein the symbol element is arranged on, against, and/or in the activation element, and wherein the activation element and the symbol element are in one piece.

* * * * *